United States Statutory Invention Registration [19]

[11] Reg. Number: H950

O'Brien et al. [43] Published: Aug. 6, 1991

[54] METHOD OF INFUSION OF FRUIT

[75] Inventors: Carol A. O'Brien; Michael E. Augustine, both of Decatur, Ill.

[73] Assignee: A. E. Staley Manufacturing Company, Decatur, Ill.

[21] Appl. No.: 590,547

[22] Filed: Sep. 27, 1990

Related U.S. Application Data

[63] Continuation-in-part of Ser. No. 488,198, Mar. 5, 1990, abandoned, which is a continuation-in-part of Ser. No. 434,946, Nov. 9, 1989, abandoned.

[51] Int. Cl.[5] ..... A23B 7/08; A23B 7/14

[52] U.S. Cl. ..... 426/639; 426/102; 426/103; 426/506

[58] Field of Search ..... 426/102, 103, 639, 640, 426/506, 331, 811

[56] References Cited

U.S. PATENT DOCUMENTS

| | | | |
|---|---|---|---|
| 2,591,213 | 4/1952 | Stupin et al. | 426/506 |
| 3,952,112 | 4/1976 | Fulger et al. | 426/321 |
| 4,103,035 | 7/1978 | Fulger et al. | 426/321 |
| 4,256,772 | 3/1981 | Shanbhag et al. | 426/331 |
| 4,350,711 | 9/1982 | Kahn et al. | 426/102 |
| 4,364,968 | 12/1982 | Waitman et al. | 426/639 |
| 4,390,550 | 6/1983 | Kahn et al. | 426/102 |
| 4,418,082 | 11/1983 | Kahn et al. | 426/51 |
| 4,542,033 | 9/1985 | Agarwala | 426/321 |
| 4,551,348 | 11/1985 | O'Mahoney et al. | 426/639 |
| 4,626,434 | 12/1986 | O'Mahoney et al. | 426/50 |
| 4,775,545 | 10/1988 | Augustine et al. | 426/639 |

OTHER PUBLICATIONS

Bolin, H. R., et al., "Effect of Osmotic Agents and Concentrations on Fruit Quality", *Journal of Food Science,* 48(1):202–205 (1983).

*Primary Examiner*—Robert L. Stoll
*Assistant Examiner*—Daniel S. Metzmaier

[57] ABSTRACT

A method of infusion of fruit is provided. Dried fruit is hydrated in a solution of fructose prior to infusion with a solution of fructose. The rehydration step raises the ratio of fructose to dextrose of the fruit which improves the organoleptic qualities and stability of the infused fruit.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF INFUSION OF FRUIT

CROSS-REFERENCE TO RELATED APPLICATIONS

This application is a continuation-in-part of application Ser. No. 07/488,198, filed Mar. 5, 1990, now abandoned, which was a continuation-in-part of application Ser. No. 07/434,946 filed Nov. 9, 1989, now abandoned.

FIELD OF THE INVENTION

This invention relates to a sweetened fruit. More particularly, this invention relates to a product of and a method for preparing sweetened fruit.

BACKGROUND OF THE INVENTION

Fruits have been preserved against microbial spoilage by drying to very low moisture levels since time immemorial. It is now known that microbial spoilage is a function of water activity rather than moisture content. Water activity is the ratio of the vapor pressure of water in a material to the vapor pressure of pure water at the same temperature. Microorganisms have limits on their ability to prevent the loss of water from their cells and, if the water activity of their environment is too low, the cells cannot regulate the water loss and either become dormant or die. For example, few bacteria can survive at water activities less than about 0.85, few yeasts can survive at activities less than about 0.80, and few molds can survive at activities less than about 0.71.

In addition to its role in microbial spoilage, the water activity of a fruit is important when the fruit is used in products such as breakfast cereals. The cereal flakes, commonly derived from corn, wheat, rice, or other grains, are generally very dry and crisp with moisture contents of less than about 5.0 weight percent and water activities of less than about 0.5. If a fruit having a water activity higher than that of the flakes is mixed with the flakes, there will be a transfer of water from the fruit to the flakes, causing the flakes to become soggy. Accordingly, to retard or eliminate microbial spoilage and to reduce or eliminate the flow of water to the cereal flakes, fruits having low water activities are used in breakfast cereals. To date, the primary means for obtaining a fruit with a low water activity is to dry it to a low moisture level.

The use of extremely dry fruit in breakfast cereals is not without disadvantages. Extremely dry fruit tends to be hard, shrivelled, poor-tasting, and otherwise undesirable organoleptically. A soft, firm, pleasant-tasting fruit having a higher moisture level, but still having a low water activity, would be very desirable for use in breakfast cereals and in other applications.

A number of processes have been disclosed for infusing fruit with sugar or other humectants by immersion in a concentrated aqueous solution. When the fruit's water activity exceeds that of the solution and the solution's humectant activity exceeds that of the fruit, there is diffusion of water from the fruit to the solution and diffusion of the humectant from the solution to the fruit until equilibrium is reached. An increase in humectant content lowers the water activity of the fruit by reason of the humectant's ability to "bind" water.

U.S. Pat. No. 4,775,545, issued Oct. 4, 1988, (Augustine et al.) reviews a number of publications relevant to this topic (the relevant portions of said patent being incorporated herein by reference).

For example, Augustine et al. discuss U.S. Pat. No. 4,256,772, issued Mar. 17, 1981, (Shanbhag) which discloses a process for preparing fruits having a moisture content of about 18 to 34 weight percent and a water activity of about 0.40 to 0.65 for use in breakfast cereals. The fruits are infused with certain solutes to attain a lower water activity relative to their moisture content. Suitable solutes are edible polyhydric alcohols such as glycerol, mannitol, sorbitol, and propylene glycol, and sugars such as dextrose and sucrose. Shanbhag states that the process may be started with a fruit having a moisture content much higher than 15 weight percent and then dehydrating the fruit prior to infusion to produce an infused fruit having the desired moisture content. Example V of Shanbhag describes the infusion of commercial dehydrated peach slices.

U.S. Pat. No. 4,390,550, issued June 28, 1983, (Kahn) discloses in Example 11 another process for infusing fruit with solutes to control its water activity at about 0.45 to 0.65. Kahn bathes the fruit in a fructose-containing corn syrup comprising about 70 to 80 percent sugar solids, about 40 to 90 percent of which is fructose.

U.S. Pat. No. 4,350,711, issued Sept. 12, 1982, (Kahn) also discusses a process for infusing fruit with solutes. Kahn bathes the fruit in a series of at least two aqueous sugar solutions, the sugar in each of which comprises about 35 to 100 weight percent fructose, to gradually increase the sugar content of the fruit to about 32 to 55 weight percent. Kahn states that the gradual increase in sugar content minimizes "osmotic shock" and results in a reduced loss of volume by the fruit. Kahn teaches that the "driving force for the infusion of the sugar solutes of the infusion bath into the fruit is the osmotic pressure of the system resulting from the fact that the sugar solids concentration of the bath is greater than the water soluble solids content of the fruit prior to infusion." Kahn at col. 3, lines 3 to 8. Kahn further states that, in general, prior to infusion, the fruit is de-stemmed, the core is removed, and the fruit is washed and/or bathed in a solution of salt or acid (e.g., ascorbic acid).

Another fruit infusion process is disclosed in U.S. Pat. No. 4,551,348, issued Nov. 5, 1985 (O'Mahoney) and in U.S. Pat. No. 4,626,434, issued Dec. 2, 1986 (O'Mahoney). O'Mahoney bathes the fruit in an aqueous sugar solution having about 30 to 84 weight percent solids, about 35 to 100 weight percent of which is fructose, which is stabilized against dilution by the addition of a concentrated sugar solution into the bath and the withdrawal of a substantially equal volume of diluted syrup. O'Mahoney states that this process enables fruit solute levels to be raised to the desired level before detrimental shrinkage of the fruit due to dehydration occurs. O'Mahoney also states that, in general, prior to infusion, the fruit is de-stemmed, the core is removed, and the fruit is washed (including bathing in aqueous salt of acid) and dried.

U.S. Pat. No. 4,542,033, issued Sept. 17, 1985, (Agarwala) discloses an infusion process especially adapted for fruits having a high pectin content, such as apples, pears, cherries, etc. The fruits are cooked in an aqueous sugar solution (at least 30% solids) at a pH of about 1.5 to 3.75 and then cooled below their gelling point to form a gel within and between the cells of the fruit. Fructose is disclosed as a suitable sugar.

U.S. Pat. No. 4,364,968, issued Dec. 21, 1982, (Waitman et al.) discloses a process for preparing a dried grape product comprising infusing a grape with a carbohydrate (e.g., glycerol, fructose, or high fructose corn syrup) and drying the infused grape to produce a raisin-like fruit. At col. 4, lines 61–68, Waitman et al. favorably compare their process to the process of drying a grape to form a raisin, then infusing the raisin and then again drying the infused raisin.

U.S. Pat. No. 4,103,035, issued July 25, 1978, (Fulger) discloses a process for treating raisins and other fruits to improve their softness retention under storage conditions. The first step of the process is to contact the fruit with a hot, weak acid and then wash with water. After washing, the moisture content of the fruit is about 22 weight percent. The second step of the process is to contact the fruit with an edible polyalcohol humectant. Preferred humectants are glycerol and sorbitol. Other humectants disclosed include inverted sugar syrup. The third step is to wash with water and dry to a moisture content of about 12 to 20 weight percent. Fulger states that the acid treatment prior to contact with the humectant improves the fruit's absorption of the humectant. The treated fruit has a humectant content of about 3 to 20 weight percent. Water activities of the treated fruit are not given.

U.S. Pat. No. 3,952,112, issued Apr. 20, 1976, (Fulger) discloses another process for treating raisins and other fruits to improve their softness retention under storage conditions. In place of the acid treatment step disclosed in his '035 patent, Fulger discloses a number of other procedures which improve the fruit's absorption of the humectant. In particular, Fulger teaches that the removal of air bubbles and/or fruit waxes by application of a vacuum and/or washing with a surfactant or alkali is beneficial. Fulger also teaches that absorption of humectants is improved by raising the moisture level of the fruit prior to contact with the humectant:

> It has also been found that the initial moisture content of the fruit, prior to exposure to the humectant, affects the rate at which the humectant will be absorbed. In general, the higher the initial moisture content of the raisins, the faster will be the rate of absorption. It is believed that at the higher moisture levels, the moisture dissolves fruit sugars in the fruit and enables the humectant to penetrate the fruit more easily.

Fulger at col. 4, lines 24 to 31.

Bolin, H. R. et al., "Effect of Osmotic Agents and Concentrations on Fruit Quality", *Journal of Food Science* 48(1):202–205 (1983), describe infusion of fruits in sucrose solutions and in high fructose corn syrups. Bolin et al. found that the high fructose corn syrup absorbed further in the fruit than the sucrose and that fruits infused in high fructose corn syrup exhibited lower water activities than those infused in a sucrose solution.

U.S. Pat. No. 4,418,082, issued Nov. 29, 1983, (Kahn et al.) discloses the generation of fructose within whole fruit or segments of fruit by inoculation with enzyme. At col. 2, lines 16–40, and col. 4, lines 26–29, Kahn et al. also refer to the enzymatic isomerization of glucose to fructose, as well as "inversion" of sucrose to fructose and glucose.

In summary, a variety of processes for infusing fruit with fructose and other humectants have been disclosed. The primary goal of many of the processes has been to increase the rate at which the humectant is absorbed by the fruit or to reduce damage to the fruit upon drying and on infusion. Kahn et al. '082 discloses the use of enzymes, as discussed above, to convert fructose to glucose as well as generally increase the fructose content. Augustine et al. disclose that predrying raisins enables one to obtain a higher fructose:dextrose ratio than is obtained by infusion alone.

SUMMARY OF THE INVENTION

The general object of this invention is to provide a sweetened fruit having excellent organoleptic qualities and stability. A more particular object of this invention is to provide such a fruit which is especially suited for use in breakfast cereals.

This invention particularly relates to a method of infusing raisins loss of soluble solids from said raisins consisting essentially of:

hydrating substrate raisins in a first solution consisting essentially of a major amount of water and a minor amount of fructose, said first solution being at a temperature and said hydrating being for a time sufficient to substantially raise the moisture content of said raisins and reduce the dextrose content of said raisins;

infusing said hydrated raisins with a solution consisting essentially of a minor amount of water and a major amount of fructose, said second solution being at a temperature and said infusing being for a time sufficient to substantially increase the fructose content of said raisins;

rinsing and drying said infused raisins to produce product raisins having a higher ratio of fructose to dextrose, a lower water activity, and a softer texture than said substrate raisins.

This invention also relates to a dried, infused raisin having a moderate moisture content (e.g., from about 10% to about 20% moisture by weight), a fructose content of at least about 40% (e.g., 40% to 50%) by weight, and a fructose to dextrose ratio greater than about 1.30 (e.g., 1.5 to 1.9).

DETAILED DESCRIPTION OF THE INVENTION

A. Dried Fruit

Any dried fruit capable of undergoing an osmotic exchange with an aqueous sugar solution is suitable for use in the process of this invention. In other words, fruit which has been previously air-dried, freeze-dried, vacuum-dried, or otherwise dehydrated, may be employed. Illustrative dried fruits include the dried forms of apples, apricots, bananas, blackberries, blueberries, cherries, grapes, melons, peaches, pears, pineapples, plums, raspberries, and strawberries. Especially suitable, however, are raisins.

This invention is based, in part, on the discovery that restoring, prior to infusion, part of the initial moisture content of the fruit dried with a solution consisting essentially of water and fructose maximizes the organoleptic qualities and stability of the fruit. In general, it is preferred to use a fruit having a reduced moisture content of at least about 50 percent of the original and most preferred having a reduced moisture content of at least about 67 percent. Fruits vary widely in their moisture contents. Table I shows the normal moisture contents of various fresh fruit and their typical moisture contents prior to hydrating. All moisture contents are based on the edible portion of the fruit. The data on normal moisture contents is from the *Composition of Foods Handbook*, No. 8–9 published by the United States Department of Agriculture. Raisins suitable for use herein are available commercially. They typically have a moisture content of 15–18% by weight, a fructose content of 35–39% by weight, a dextrose content of 31–34% by weight and a water activity of 0.55–0.62.

TABLE I

| Fruit | Moisture Contents of Fruit: Normal Moisture Content (Wt. %) | Typical Moisture Content When Dried (Wt. %) |
|---|---|---|
| Apples | 84 | 42 |
| Bananas | 74 | 37 |
| Blackberries | 86 | 43 |
| Blueberries | 85 | 43 |
| Cherries | 86 | 43 |
| Grapes | 81 | 41 |
| Melons | 90 | 45 |
| Peaches | 88 | 44 |
| Pears | 84 | 42 |
| Pineapples | 87 | 44 |
| Plums | 85 | 43 |
| Raisins | — | 15 |
| Raspberries | 87 | 44 |
| Strawberries | 92 | 46 |

B. Hydration in a Fructose Solution

The first step in treating the dried fruit is hydration in a solution consisting essentially of a major amount of water (i.e., at least about 50% by weight) and a minor amount (i.e., less than about 50% by weight) of fructose. In addition to hydrating the dried fruit, the hydrating step will serve to remove a portion of the dextrose in said fruit. This removal, in conjunction with the infusion step, will raise the ratio of fructose to dextrose in the raisin, thus contributing to the improved organoleptic qualities and stability of the product fruit. (For example, a higher fructose to dextrose ratio yields a sweeter fruit having a softer texture, due to increased plasticization by fructose and inhibition of dextrose crystallization, and a cleaner appearance, due to reduced "sweating" on the surface of the fruit.) Accordingly, the hydrating solution should have a substantially lower dextrose content than the fruit and, most preferably, is substantially free of dextrose prior to the hydrating step.

The amount of fructose in the hydrating solution prior to hydrating should be adjusted to prevent substantial removal of fructose from the hydrating fruit or infusion of fructose into the hydrating fruit during the hydrating step. Thus, the concentration of fructose in the hydrating medium (by weight of the solution) should be roughly equal to the concentration of fructose in the fruit (by weight of the sum of the moisture and the fructose in the fruit prior to the hydrating step). This concentration will vary for a given fruit, but for raisins, for example, the hydrating solution should contain approximately 15–30%, e.g., about 20% by weight fructose. The precise temperature of the hydrating solution is not critical and typically may range from ambient (i.e., about 20° C. to 30° C.) to mildly elevated (e.g., about 45° C.). The time of hydrating should be adjusted (in relation to the ratio of hydrating solution to fruit) to obtain the desired hydration and removal of dextrose and will typically range from about ½ to about 4 hours, preferably 1 to 2 hours, when the ratio of hydrating solution to fruit is about 2:1. If the ratio of hydrating solution to fruit is lowered, the hydrating time period should be lengthened, and vice versa. Typically, the ratio of hydrating solution to fruit will be from about 1:1 to about 4:1.

The fruit may also be processed in other ways before hydrating and/or infusion to improve these processes. For example, certain fruits possess natural barriers to permeation and it is advantageous to physically pierce the barriers. Various barrier piercing techniques, including peeling and slicing, are described in U.S. Pat. No. 4,350,711, issued Sept. 21, 1982, (Kahn) which is incorporated by reference. Another useful technique to remove permeation barriers is to rapidly freeze the fruit by the process known in the trade as the individual quick freezing ("IQF") process. This process causes the formation of relatively long and thin ice crystals which puncture the permeation barriers of the fruit without the substantial damage to the fruit's cellular structure often associated with conventional slow-freezing techniques. Permeation barrier reduction, by any of these means, is advantageously performed before drying because the barrier reduction also increases the rate of drying.

Another process optionally performed before infusion is treating the fruit to maintain its color and to avoid the well-known enzymatic browning reaction. Conventional color maintenance processes include treating the fruit with sulfur compounds (such as sodium metabisulfite), ascorbic acid, malic acid, sodium chloride, and ethylenediamine tetraacetic acid.

C. Infusing in an Aqueous Sugar Solution

The hydrated fruit is infused by bathing it in an aqueous sugar solution having a high concentration of fructose. The term "sugar" is used to describe a carbohydrate having one, two, or more saccharose groups. In other words, the term is not used as a synonym for sucrose. Sugars which may also be present, preferably in very minor amounts, if at all, include sucrose, maltose, invert sugar, and sorbitol. The presence of dextrose in the infusion solution should be minimized or eliminated.

The aqueous sugar solution generally has a sugar content of about 70 to 95 weight percent. Other things being equal, the rate of infusion is generally increased as the soluble solids level is increased. However, solids levels above about 95 weight percent are difficult to achieve and to work with.

About 75 weight percent of the sugar is preferably fructose and more preferably about 90 weight percent of the sugar is fructose. Fructose is preferred for a number of reasons. First of all, fructose has a high water solubility (at 60° C., fructose can produce a 90 weight percent solution compared to sucrose's 76 weight percent) and, as explained above, this property enables the rate of infusion to be increased. Secondly, fructose has more humectancy (water-binding capacity) than other sugars. Thirdly, fructose is sweeter than other sugars and enhances flavors better than other sugars. Other things being equal, maximizing fructose content in the aqueous sugar solution minimizes water activity in the infused fruit. Accordingly, it is most preferred that substantially all the sugar in the solution be fructose.

The weight ratio of aqueous sugar solution to fruit varies from about 1:1 to 7:1. During bathing, the entire fruit is submerged. The temperature of the solution is generally about 5° to 110° C., and preferably about 20° to 80° C. The rate of infusion increases as the temperature of the solution increases. The infusion process may be performed in a batch or continuous manner. The duration of the bathing is a function of the identity and physical processing of the fruit prior to infusion, the temperature and composition of the aqueous sugar solution, and the desired end product attributes. Raisins are generally bathed for a sufficient length of time to increase their fructose/glucose weight ratio by at least 15 percent (e.g., from 1.00 to 1.15) and to increase their moisture content by at least 50 percent (e.g., from 6 weight percent to 9 weight percent). It is difficult to set corresponding endpoints for other fruits because their fructose/glucose weight ratios can change with time even without infusion and because their initial moisture contents vary widely.

Other non-sugar components are optionally present in the aqueous sugar solution. For example, the addition of about 1 to 5 weight percent of an edible calcium compound such as calcium carbonate, calcium lactate, calcium hydroxide, etc., to the solution improves the final texture of fruits, like bananas, which have a tendency of becoming overly soft or mushy. A secondary benefit to the use of calcium compounds is that it raises the pH of the aqueous sugar solution and shifts the fructose equilibrium away from the formation of difructose. Color preservation agents previously discussed, such as ascorbic acid and/or malic acid, are also optionally present.

D. Subsequent Processing and Uses

After bathing in the aqueous sugar solution, the infused fruit is separated from the solution and typically washed and dried to remove excess sugar solution from the surface. The fruit may be dried further, if desired to obtain a certain moisture content or water activity. If desired, the fruit can be coated with an edible material such as vegetable oil or starch to improve its appearance and/or reduce its stickiness. The sweetened fruit is a useful food product by itself or may be used as a component of another food product, such as breakfast cereals, baked goods, bakery dry mixes, granola bars, confections, ice cream, and dry desert mixes. Sweetened fruits having water activities below about 0.5 are especially preferred for use in breakfast cereals.

The following examples will illustrate the invention and should not be construed to limit the invention, unless expressly noted otherwise, because variations of the examples within the scope and spirit of the invention will be within the skill of those in the art in possession of this specification. All amounts, parts, percentages, ratios and the like appearing throughout this specification and the appended claims are by weight, unless indicated otherwise in context.

EXAMPLES

These examples illustrate the effect of prehydration (with a fructose solution) of raisins on sugar content and water activity after infusion.

Control

Commercially available raisins (Sample A) were analyzed for moisture content, fructose and glucose content, and water activity. They had the properties shown in Table II.

A sample (100 parts by weight) of the commercially available raisins was placed into an open vessel containing 300 parts weight of an aqueous fructose solution (85 percent solids) at 49° C. The raisins were stirred and allowed to equilibrate (to approximately 65°–79° Brix of syrup). The raisins were then removed from the solution, washed with water, and dried in an oven to 16% to 20% moisture (Sample B). The raisins were then analyzed. The results are shown in Table II.

EXAMPLES 1 and 2

Another sample (100 parts by weight) of the commercially available raisins were soaked in 200 parts by weight of a 20% solution of crystalline fructose for 80 minutes at ambient temperature (20°–30° C.) (Sample C). The hydrated raisins were then infused using substantially the same procedure as used with the unhydrated raisins (Sample D). A second sample was treated in the same manner, except that the wash with water and oven drying were repeated (Sample E). The results are shown in Table II.

TABLE II

Effect of Initial Moisture Content on Raisins

| Raisin Sample | Water Content (Wt. %) | Fructose Content (Wt. %) | Glucose Content (Wt. %) | Fructose to Glucose Ratio | Water Activity |
|---|---|---|---|---|---|
| A. Unhydrated Before Infusion | 18 | 32 | 35 | 0.91:1 | .55 |
| B. Unhydrated After Infusion | 12.7 | 37.8 | 31.7 | 1.19:1 | .46 |
| C. Prehydrated Before Infusion | 40 | 28 | 25.5 | 1.09:1 | .97 |
| D. Prehydrated After Infusion | 17.5 | 42.2 | 23.9 | 1.76:1 | .49 |
| E. Prehydrated After Infusion Double-Washed | 16 | 42.3 | 27.5 | 1.5:1 | .43 |

These results show that hydrating the raisins in a solution of fructose prior to infusion with an aqeuous fructose solution significantly increased the ratio of fructose to glucose in the infused raisin and also significantly lowered its water activity.

EXAMPLES 3–8

To further explore the hydration step, a series of hydrations (without subsequent infusion and drying) were performed as in Examples 1 and 2, and variations thereof wherein the solids levels of the prehydration solution were increased to 35% and 45% crystalline fructose in Examples 4 and 5, respectively, and the temperature of hydration was elevated to 43° C. for each of Examples 6, 7, and 8. The fructose and glucose content, the ratio of the two, and the moisture of the raisins during prehydration are shown below.

EXAMPLE 3
20% Solution-Ambient Temperature

| Time (Minutes) | Fructose (Wt. %) | Glucose (Wt. %) | Fructose: Glucose Ratio | Moisture (Wt. %) |
|---|---|---|---|---|
| 0 | 31.21 | 32.53 | .95:1 | 18.25 |
| 25 | 29.70 | 29.90 | .99:1 | — |
| 65 | 28.19 | 26.83 | 1.05:1 | 38.04 |
| 140 | 25.20 | 20.99 | 1.20:1 | 46.45 |
| 240 | 22.89 | 16.38 | 1.39:1 | — |
| 310 | 23.00 | 17.04 | 1.34:1 | — |
| 325 | 22.60 | 16.00 | 1.41:1 | 53.85 |
| 355 | 22.50 | 14.86 | 1.51:1 | — |

-continued

EXAMPLE 3
20% Solution-Ambient Temperature

| Time (Minutes) | Fructose (Wt. %) | Glucose (Wt. %) | Fructose: Glucose Ratio | Moisture (Wt. %) |
|---|---|---|---|---|
| 385 | 22.38 | 15.87 | 1.41:1 | — |
| 430 | 22.39 | 14.66 | 1.52:1 | 55.37 |
| 530 | 20.06 | 11.72 | 1.71:1 | — |

EXAMPLE 4
35% Solution-Ambient Temperature

| Time (Minutes) | Fructose (Wt. %) | Glucose (Wt. %) | Fructose: Glucose Ratio | Moisture (Wt. %) |
|---|---|---|---|---|
| 0 | 32.32 | 35.02 | .92:1 | 18.65 |
| 30 | 31.45 | 31.39 | 1:1 | 25.04 |
| 60 | 30.77 | 30.11 | 1.02:1 | 25.08 |
| 120 | 29.67 | 26.32 | 1.12:1 | 28.97 |
| 180 | 28.97 | 24.66 | 1.17:1 | 31.30 |

EXAMPLE 5
45% Solution-Ambient Temperature

| Time (Minutes) | Fructose (Wt. %) | Glucose (Wt. %) | Fructose: Glucose Ratio | Moisture (Wt. %) |
|---|---|---|---|---|
| 0 | 35.37 | 35.37 | .90:1 | 20 |
| 30 | 32.76 | 33.29 | .98:1 | 23 |
| 60 | 32.54 | 30.38 | 1.07:1 | 27 |
| 120 | 31.35 | 28.08 | 1.12:1 | 28 |
| 180 | 31.42 | 27.06 | 1.16:1 | 31 |

EXAMPLE 6
20% Solution-110° F.

| Time (Minutes) | Fructose (Wt. %) | Glucose (Wt. %) | Fructose: Glucose Ratio | Moisture (Wt. %) |
|---|---|---|---|---|
| 0 | 32.48 | 34.99 | .92:1 | 19 |
| 30 | 29.75 | 27.92 | 1.06:1 | 30 |
| 60 | 26.09 | 23.61 | 1.10:1 | 38 |
| 120 | 26.15 | 22.41 | 1.16:1 | 45 |
| 180 | 24.39 | 19.30 | 1.26:1 | 47 |

EXAMPLE 7
35% Solution-110° F.

| Time (Minutes) | Fructose (Wt. %) | Glucose (Wt. %) | Fructose: Glucose Ratio | Moisture (Wt. %) |
|---|---|---|---|---|
| 0 | 32.45 | 35.01 | .92:1 | 19 |
| 30 | 31.95 | 28.62 | 1.11:1 | 28 |
| 60 | 29.85 | 25.46 | 1.17:1 | 34 |
| 120 | 29.23 | 24.18 | 1.20:1 | 36 |
| 180 | 29.76 | 19.26 | 1.54:1 | 41 |

EXAMPLE 8
45% SOLUTION-110° F.

| Time (Minutes) | Fructose (Wt. %) | Glucose (Wt. %) | Fructose: Glucose Ratio | Moisture (Wt. %) |
|---|---|---|---|---|
| 0 | 32.04 | 35.01 | .91:1 | 18 |
| 30 | 32.24 | 31.62 | 1.01:1 | 20 |
| 60 | 31.36 | 27.89 | 1.12:1 | 31 |
| 120 | 31.56 | 24.66 | 1.27:1 | 31 |

-continued

EXAMPLE 8
45% SOLUTION-110° F.

| Time (Minutes) | Fructose (Wt. %) | Glucose (Wt. %) | Fructose: Glucose Ratio | Moisture (Wt. %) |
|---|---|---|---|---|
| 180 | 32.46 | 23.18 | 1.40:1 | 34 |

EXAMPLES 9–12

Another series of hydrations were performed as follows. Raisins were immersed in a bath containing a 35% dry solids solution of crystalline fructose in water at weight ratios of fructose solution to raisins of 2:1 in Examples 9 and 11 and 3:1 in Examples 10 and 12. The temperature of the hydration bath was ambient (about 25° C.) in Examples 9 and 10 and about 43° C. in Examples 11 and 12. The raisins were removed from the bath after four hours and then dried at about 60° C. for about five and one-half hours. The fructose and glucose content, the ratio of the two, and the moisture content of the dried samples are set forth below.

EXAMPLE 9
Ratio of Solution to Raisins of 2:1 at Ambient Temperature

| Time (Minutes) | Ratio of Fructose to Glucose | Fructose (Wt. %) | Glucose (Wt. %) |
|---|---|---|---|
| 0 | .91:1 | 31.96 | 35.15 |
| 30 | .99:1 | 30.75 | 30.98 |
| 60 | .99:1 | 30.03 | 30.35 |
| 120 | 1.06:1 | 29.88 | 28.22 |
| 180 | 1.15:1 | 28.94 | 25.20 |
| 240 | .98:1 | 29.04 | 29.53 |
| Dried | 1.19:1 | 37.50 | 31.33 |

The moisture content of the dried sample by the Karl Fischer method was 11.83% by weight. The glucose value and the resulting at 240 minutes is questionable in view of the results at 180 minutes and the results of the dried sample.

EXAMPLE 10
Ratio of Solution to Raisins of 3:1 at Ambient Temperature

| Time (Minutes) | Ratio of Fructose to Glucose | Fructose (Wt. %) | Glucose (Wt. %) |
|---|---|---|---|
| 0 | .91:1 | 32.79 | 35.86 |
| 30 | .98:1 | 31.30 | 31.62 |
| 60 | 1.00:1 | 30.84 | 30.60 |
| 120 | 1.04:1 | 29.70 | 28.34 |
| 180 | 1.13:1 | 28.64 | 25.17 |
| 240 | 1.20:1 | 28.69 | 23.73 |
| Dried | 1.22:1 | 36.35 | 29.75 |

The moisture content of the dried sample was 15.06% by weight.

EXAMPLE 11
Ratio of Solution to Raisins of 2:1 at 43C

| Time (Minutes) | Ratio of Fructose to Glucose | Fructose (Wt. %) | Glucose (Wt. %) |
|---|---|---|---|
| 0 | .91:1 | 32.48 | 35.51 |
| 30 | 1.00:1 | 29.85 | 29.82 |
| 60 | 1.10:1 | 29.77 | 27.00 |
| 120 | 1.14:1 | 28.75 | 25.08 |

-continued

EXAMPLE 11
Ratio of Solution to Raisins of 2:1 at 43C

| Time (Minutes) | Ratio of Fructose to Glucose | Fructose (Wt. %) | Glucose (Wt. %) |
|---|---|---|---|
| 180 | 1.25:1 | 28.58 | 22.82 |
| 240 | 1.33:1 | 28.20 | 21.14 |
| Dried | 1.34:1 | 40.23 | 29.92 |

The moisture content of the dried sample was 12.66% by weight.

EXAMPLE 12
Ratio of Solution to Raisins of 3:1 at 43C

| Time (Minutes) | Ratio of Fructose to Glucose | Fructose (Wt. %) | Glucose (Wt. %) |
|---|---|---|---|
| 0 | .91:1 | 32.64 | 35.60 |
| 30 | 1.04:1 | 29.31 | 27.98 |
| 60 | 1.12:1 | 29.34 | 26.15 |
| 120 | 1.20:1 | 28.96 | 24.12 |
| 180 | 1.35:1 | 27.86 | 20.51 |
| 240 | 1.40:1 | 27.82 | 19.77 |
| Dried | 1.41:1 | 39.75 | 28.12 |

The moisture content of the dried sample was 12.45% by weight.

EXAMPLE 13

Dried apricots were rehydrated and infused according to the following two-step procedure.

Step 1: Rehydration

Dried apricots were rehydrated using the following additional ingredients and procedure.

| Ingredients for rehydration solution: | |
|---|---|
| Crystalline Fructose (KRYSTAR 300 ®, A. E. Staley Mfg. Co.) | 20.0% |
| Ascorbic Acid | 2.0% |
| Water | 78.0% |

Rehydration Procedure

1. Dissolve ascorbic acid in water. (If desired, other acids could be substituted at this time.)
2. Place the crystalline fructose into water containing dissolved acid and stir until completely dissolved.
3. Add dried apricot pieces to the above solution in a proportion by weight of 2 parts of rehydration solution per part of dried apricot pieces.
4. Allow apricot pieces to remain in the solution (ambient temperature) for 90 minutes. No agitation is required at this time.
5. Remove apricot pieces from solution and allow a 5 minute drain time to remove excess rehydration solution from the fruit.
6. Recovered apricots are now ready for the infusion step.

Step 2. Infusion

| Ingredients For Infusion Step: | |
|---|---|
| Crystalline Fructose (KRYSTAR 300 ®, A. E. Staley Mfg. Co.) | 85.0% |
| Ascorbic Acid | 2.0% |
| Water | 13.0% |
| Total | 100.0% |

Infusion Procedure

1. Dissolve ascorbic acid in water.
2. Place water and ascorbic acid mixture into kettle which can be heated. Slowly add the crystalline fructose while heating to 100° F., continue agitation until all of the crystalline fructose is in solution.
3. Maintain solution temperature at 110° F. through out the infusion step. Gentle agitation or pumping the solution from the bottom of the kettle over the top of the fruit will also maintain a uniform solution.
4. Add apricot pieces recovered from the rehydration step in a proportion (based on weight of apricots before rehydration) of 1 part apricots per 3 parts of infusion solution.
5. Allow apricot pieces to infusion for approximately 3 hours, until Brix reading of the solution is 78°.
6. Remove apricot pieces from infusion solution and allow a 30 minute drip time to drain away excess solution. This step could be by-passed, but a very significant decrease in drying time will be realized if the 30 minute drain time is completed.
7. Rinse apricot pieces in water to remove excess infusion solution. Brix reading will be approximately 13°-20° when rinse is complete.
8. Dry to desired moisture and Aw. Drying time will vary depending upon the drying equipment, bed depth, drying temperature, etc.

What is claimed is:

1. A method of infusing raisins to increase the fructose content without significant loss of soluble solids from said raisins consisting essentially of:

hydrating substrate raisins in a first solution consisting essentially of a major amount of water and a minor amount of fructose, said first solution temperature and said hydrating time is sufficient to substantially raise the moisture content of said raisins and reduce the dextrose content of said raisins;

infusing said hydrated raisins with a solution consisting essentially of a minor amount of water and a major amount of fructose, said second solution temperature and said infusing time is sufficient to substantially increase the fructose content of said raisins;

rinsing and drying said infused raisins to produce product raisins having a higher ratio of fructose to dextrose, a lower water activity, and a softer texture than said substrate raisins.

* * * * *